(12) United States Patent
Liu et al.

(10) Patent No.: US 12,547,808 B2
(45) Date of Patent: Feb. 10, 2026

(54) METHOD AND DEVICE FOR DESIGNING GATE DRIVING CIRCUIT, AND CONTROLLER

(71) Applicant: SHENZHEN CHINA STAR OPTOELECTRONICS SEMICONDUCTOR DISPLAY TECHNOLOGY CO., LTD., Shenzhen (CN)

(72) Inventors: Siyang Liu, Shenzhen (CN); Zui Wang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 1230 days.

(21) Appl. No.: 17/427,096

(22) PCT Filed: Jul. 16, 2021

(86) PCT No.: PCT/CN2021/106780
§ 371 (c)(1),
(2) Date: Jan. 5, 2023

(87) PCT Pub. No.: WO2023/272796
PCT Pub. Date: Jan. 5, 2023

(65) Prior Publication Data
US 2024/0046019 A1    Feb. 8, 2024

(30) Foreign Application Priority Data
Jun. 28, 2021  (CN) .................. 202110717137.9

(51) Int. Cl.
*G06F 30/392* (2020.01)
*G06F 111/20* (2020.01)
*G06F 117/12* (2020.01)

(52) U.S. Cl.
CPC ........ *G06F 30/392* (2020.01); *G06F 2111/20* (2020.01); *G06F 2117/12* (2020.01)

(58) Field of Classification Search
CPC .............. G06F 30/392; G06F 2111/20; G06F 2117/12; G06F 16/252; G06F 30/398
See application file for complete search history.

(56) References Cited

U.S. PATENT DOCUMENTS

| 6,539,528 | B2 * | 3/2003 | Hwang | ................... G06F 30/39 716/139 |
| 11,403,448 | B1 * | 8/2022 | Yu | ......................... G06F 30/392 |

(Continued)

FOREIGN PATENT DOCUMENTS

| CN | 110930909 A | 3/2020 |
| CN | 111883066 A | 11/2020 |

OTHER PUBLICATIONS

International Search Report in International application No. PCT/CN2021/106780, mailed on Mar. 28, 2022.

(Continued)

*Primary Examiner* — Nha T Nguyen
(74) *Attorney, Agent, or Firm* — PV IP PC; Wei Te Chung

(57) ABSTRACT

The present application provides a method and a device for designing a gate driving circuit, a controller, and a storage medium. The method includes: acquiring size information of a target panel and determining location information of a target area according to the size information of the target panel; calling and combining size information of a standard panel, characteristic label information of a plurality of standard devices, and an architecture type identifier acquired (Continued)

to determine characteristic label information of at least one target device, in order to generate a target gate driving circuit in the target area.

15 Claims, 3 Drawing Sheets

(56) References Cited

U.S. PATENT DOCUMENTS

| | | | | |
|---|---|---|---|---|
| 11,763,060 | B2* | 9/2023 | Yang | G06F 11/324 |
| | | | | 716/119 |
| 11,816,253 | B2* | 11/2023 | Trivedi | G06F 11/0751 |
| 11,847,396 | B1* | 12/2023 | Jain | G06F 30/327 |
| 12,372,864 | B2 | 7/2025 | Fujimura | G03F 1/36 |
| 2002/0029371 | A1 | 3/2002 | Hwang et al. | |
| 2004/0164935 | A1* | 8/2004 | Dedene | H10K 59/353 |
| | | | | 345/75.2 |
| 2009/0083681 | A1 | 3/2009 | McCoo et al. | |
| 2016/0019329 | A1* | 1/2016 | Eldesouki | G06T 3/4053 |
| | | | | 716/124 |
| 2018/0336840 | A1* | 11/2018 | Niikura | C09K 19/02 |
| 2019/0294751 | A1* | 9/2019 | Yuan | G06F 30/394 |
| 2021/0020086 | A1* | 1/2021 | Ji | G09G 3/20 |
| 2021/0357096 | A1* | 11/2021 | Jiang | G06F 3/04166 |
| 2021/0357568 | A1* | 11/2021 | Or-Bach | G06F 30/392 |
| 2022/0093027 | A1* | 3/2022 | Hong | G11C 19/28 |
| 2022/0130312 | A1* | 4/2022 | Niioka | G09G 3/20 |
| 2022/0208791 | A1* | 6/2022 | Li | H10K 59/123 |
| 2022/0309221 | A1* | 9/2022 | Yang | G06F 11/324 |
| 2023/0042963 | A1* | 2/2023 | Lin | G09G 3/3266 |

OTHER PUBLICATIONS

Written Opinion of the International Search Authority in International application No. PCT/CN2021/106780, mailed on Mar. 28, 2022.

* cited by examiner

METHOD AND DEVICE FOR DESIGNING GATE DRIVING CIRCUIT, AND CONTROLLER

RELATED APPLICATIONS

This application is a Notional Phase of PCT Patent Application No. PCT/CN2021/106780 having international filing date of Jul. 16, 2021, which claims the benefit of priority of Chinese Patent Application No. 202110717137.9 filed on Jun. 28, 2021. The contents of the above applications are all incorporated by reference as if fully set forth herein in their entirety.

BACKGROUND OF INVENTION

Field of Invention

The present disclosure relates to the field of display technology, in particular to a method and a device for designing a gate driving circuit, a controller, and a storage medium.

Description of Prior Art

Currently, when drawing a gate driving circuit of a display panel, manual inputs of a corresponding set of parameters to a system are needed, and the system then draws a corresponding gate driving circuit according to the corresponding set of parameters. In this way, when drawing gate driving circuits of display panels of different sizes, a plurality of sets of parameters corresponding to the display panels of multiple sizes are needed to be input to the system for drawing, respectively, which leads to extremely high labor costs, and due to limited manual data input speed, drawing efficiency of the gate driving circuit of the display panel is extremely low.

Therefore, it is necessary to provide a method and a device for designing a gate driving circuit, a controller, and a storage medium, that can reduce labor costs and improve the drawing efficiency of the gate driving circuit.

SUMMARY OF INVENTION

Embodiments of the present disclosure provide a method and a device for designing a gate driving circuit, a controller, and a storage medium to solve an existing technical problem that drawing efficiency of a gate driving circuit of a display panel is extremely low due to determining gate driving circuits in panels of different sizes through a manual data input manner of limited speed.

A method for designing a gate driving circuit provided by an embodiment of the present disclosure comprises:
acquiring layout information of a target panel, wherein the layout information comprises size information and an architecture type identifier of the target panel;
determining location information of a target area in the target panel according to the size information of the target panel;
calling a standard database, wherein the standard database stores size information of a standard panel and characteristic label information of a plurality of standard devices;
determining characteristic label information of at least one target device based on the size information and the architecture type identifier of the target panel according to the size information of the standard panel and the characteristic label information of at least one of the standard devices; and
generating a target gate driving circuit in the target area according to the characteristic label information of the at least one target device and the architecture type identifier.

In an embodiment, the step of determining the characteristic label information of a plurality of target devices based on the size information and the architecture type identifier of the target panel according to the size information of the standard panel and the characteristic label information of the at least one of the standard devices comprises:
determining characteristic label information of at least one reference device from the characteristic label information of the plurality of standard devices according to the architecture type identifier; and
determining the characteristic label information of the at least one target device based on the size information of the target panel according to the size information of the standard panel and the characteristic label information of the at least one reference device.

In an embodiment, the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

In an embodiment, size information of a plurality of reference devices comprises thin film transistor (TFT) size and boost capacitor (Cboost);
wherein the gate driving circuit of the standard panel comprises a plurality of thin film transistors electrically connected, wherein the TFT size is a size of any one of the thin film transistors, the TFT size comprises TFT Width, and the TFT Width is a channel width value of a corresponding thin film transistor, and the Cboost is a size of a bootstrap capacitor in the gate driving circuit of the standard panel.

In an embodiment, the target gate driving circuit comprises a plurality of target devices, and the plurality of target devices comprise a first target device and a second target device; and
the step of determining the characteristic label information of the at least one target device based on the size information and the architecture type identifier of the target panel according to the size information of the standard panel and the characteristic label information of the at least one of the standard devices comprises:
determining size information of the first target device based on the size information and the architecture type identifier of the target panel according to the size information of the standard panel and the size information of one reference device; and
determining size information of the second target device according to the size information of the first target device based on a preset rule.

In an embodiment, in the second target device and the first target device, preset rules of size information of different parts are the same or different.

In an embodiment, the target gate driving circuit further comprises at least one fixing device, and the step of generating the target gate driving circuit in the target area according to the characteristic label information of the at least one target device and the architecture type identifier comprises:

determining characteristic label information of the at least one fixing device from the characteristic label information of the plurality of standard devices according to the architecture type identifier; and generating the target gate driving circuit in the target area according to the characteristic label information of a plurality of target devices, the architecture type identifier, and the characteristic label information of the at least one fixing device.

In an embodiment, the characteristic label information of a plurality of fixing devices comprises TFT channel length, drain width, source width, and source to gate space;

wherein the gate driving circuit of the standard panel comprises a plurality of thin film transistors electrically connected, wherein the TFT channel length is a channel length of any one of the thin film transistors, the drain width is a width of a drain of any one of the thin film transistors, the source width is a width of a source of any one of the thin film transistors, and the source to gate space is a horizontal interval between the source and a gate of any one of the thin film transistors.

A device for designing a gate driving circuit provided by an embodiment of the present disclosure comprises:

an acquiring module configured to acquire layout information of a target panel, wherein the layout information comprises size information and an architecture type identifier of the target panel;

a first determining module configured to determine location information of a target area in the target panel according to the size information of the target panel;

a calling module configured to call a standard database, wherein the standard database stores size information of a standard panel and characteristic label information of a plurality of standard devices;

a second determining module configured to determine characteristic label information of at least one target device based on the size information and the architecture type identifier of the target panel according to the size information of the standard panel and the characteristic label information of at least one of the standard devices; and a generating module configured to generate a target gate driving circuit in the target area according to the characteristic label information of the at least one target device and the architecture type identifier.

In an embodiment, the second determining module comprises:

a first sub-determining module configured to determine characteristic label information of at least one reference device from the characteristic label information of the plurality of standard devices according to the architecture type identifier; and a second sub-determining module configured to determine the characteristic label information of the at least one target device based on the size information and the architecture identifier of the target panel according to the size information of the standard panel and the characteristic label information of the at least one reference device.

In an embodiment, the characteristic label information of the standard devices comprises size information of the standard devices, and the size information of the standard devices comprises the size information of the reference device, the characteristic label information of the target device comprises size information of the target device, and the size information of the reference device is used to determine the size information of the target device, and wherein the second determining module further comprises:

a third sub-determining module configured to determine the size information of the at least one reference device from the size information of the plurality of standard devices according to the architecture type identifier;

a fourth sub-determining module configured to determine the size information of the at least one target device based on the size information and the architecture identifier of the target panel according to the size information of the standard panel and the size information of the at least one reference device.

An embodiment of the present disclosure further provides a controller, wherein the controller is configured to execute a number of instructions stored in a memory to implement a method for designing a gate driving circuit, and the method comprises:

acquiring layout information of a target panel, wherein the layout information comprises size information and an architecture type identifier of the target panel;

determining location information of a target area in the target panel according to the size information of the target panel;

calling a standard database, wherein the standard database stores size information of a standard panel and characteristic label information of a plurality of standard devices;

determining characteristic label information of at least one target device based on the size information and the architecture type identifier of the target panel according to the size information of the standard panel and the characteristic label information of at least one of the standard devices; and generating a target gate driving circuit in the target area according to the characteristic label information of the at least one target device and the architecture type identifier.

In an embodiment, the step of determining the characteristic label information of a plurality of target devices based on the size information and the characteristic label identifier of the target panel according to the size information of the standard panel and the characteristic label information of the at least one of the standard devices comprises:

determining characteristic label information of at least one reference device from the architecture type information of the plurality of standard devices according to the architecture type identifier; and determining the characteristic label information of the at least one target device based on the size information of the target panel according to the size information of the standard panel and the characteristic label information of the at least one reference device.

In an embodiment, the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

In an embodiment, the target gate driving circuit comprises a plurality of target devices, and the plurality of target devices comprise a first target device and a second target device; and the step of determining the characteristic label information of the at least one target device based on the size information and the architecture type identifier of the target panel according to the size information of the standard panel and the characteristic label information of the at least one of the standard devices comprises:
  determining size information of the first target device based on the size information of the target panel according to the size information of the standard panel and the size information of one reference device; and
  determining size information of the second target device according to the size information of the first target device based on a preset rule.

An embodiment of the present disclosure further provides a storage medium, wherein a number of instructions are stored in the storage medium, and the instructions are used for executing by a controller to implement a method for designing a gate driving circuit, and the method comprises:
  acquiring layout information of a target panel, wherein the layout information comprises size information and an architecture type identifier of the target panel;
  determining location information of a target area in the target panel according to the size information of the target panel;
  calling a standard database, wherein the standard database stores size information of a standard panel and characteristic label information of a plurality of standard devices;
  determining characteristic label information of at least one target device based on the size information and the architecture type identifier of the target panel according to the size information of the standard panel and the characteristic label information of at least one of the standard devices; and
  generating a target gate driving circuit in the target area according to the characteristic label information of the at least one target device and the architecture type identifier.

In an embodiment, the step of determining the characteristic label information of a plurality of target devices based on the size information and the architecture type identifier of the target panel according to the size information of the standard panel and the characteristic label information of the at least one of the standard devices comprises:
  determining characteristic label information of at least one reference device from the characteristic label information of the plurality of standard devices according to the architecture type identifier; and
  determining the characteristic label information of the at least one target device based on the size information of the target panel according to the size information of the standard panel and the characteristic label information of the at least one reference device.

In an embodiment, the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

In an embodiment, the target gate driving circuit comprises a plurality of target devices, and the plurality of target devices comprise a first target device and a second target device; and
  the step of determining the characteristic label information of the at least one target device based on the size information and the architecture type identifier of the target panel according to the size information of the standard panel and the characteristic label information of the at least one of the standard devices comprises:
  determining size information of the first target device based on the size information of the target panel according to the size information of the standard panel and the size information of one reference device; and
  determining size information of the second target device according to the size information of the first target device based on a preset rule.

In an embodiment, the target gate driving circuit further comprises at least one fixing device, and the step of generating the target gate driving circuit in the target area according to the characteristic label information of the at least one target device and the architecture type identifier comprises:
  determining characteristic label information of the at least one fixing device from the characteristic label information of the plurality of standard devices according to the architecture type identifier; and
  generating the target gate driving circuit in the target area according to the characteristic label information of a plurality of target devices, the architecture type identifier, and the characteristic label information of the at least one fixing device.

The present disclosure provides the method and the device for designing the gate driving circuit, the controller, and the storage medium. The method comprises: acquiring the size information and the architecture type identifier of the target panel; determining the location information of the target area in the target panel according to the size information of the target panel; calling the size information of the standard panel and the characteristic label information of the plurality of standard devices in the standard database, and determining the characteristic label information of the at least one target device based on the size information and architecture type identifier of the target panel; and further generating the target gate driving circuit in the target area according to the architecture type identifier. This method can call the size information of the standard panel and the characteristic label information of the at least one standard device in the standard database according to the layout information of the target panel, and determine the location information of the target area and the characteristic label information of the plurality of target devices based on the size information of the target panel and the architecture type identifier to generate the target gate driving circuit in the target area, which prevents acquiring information such as the size information and the location information of all devices in the target gate driving circuit of the target panel to determine the target gate driving circuit, and also prevents manually inputting data to determine the target gate driving circuit. Rather, the target gate driving circuit is determined directly based on the layout information of the target panel and the relevant information in the standard database, which improves the drawing efficiency of the gate driving circuit of the display panel.

DESCRIPTION OF DRAWINGS

Technical solutions and other beneficial effects of the present disclosure will be made obvious by describing embodiments of the present disclosure in detail below in conjunction with the accompanying drawings.

DETAILED DESCRIPTION OF EMBODIMENTS

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

Terms "first" and "second" in the present disclosure are used to distinguish different objects, rather than to describe a specific order. In addition, terms "including" and "having" and any variations thereof are intended to cover non-exclusive inclusions. For example, a process, a method, a system, a product, or a device that includes a series of steps or modules is not limited to listed steps or modules, but optionally includes unlisted steps or modules, or optionally also includes other steps or modules inherent to these processes, methods, products or equipment.

Reference to "embodiments" herein means that a specific feature, structure, or characteristic described in conjunction with the embodiments may be included in at least one embodiment of the present disclosure. The appearance of the phrase in various places in the specification does not necessarily refer to the same embodiment, nor is it an independent or alternative embodiment mutually exclusive with other embodiments. Those skilled in the art clearly and implicitly understand that the embodiments described herein can be combined with other embodiments.

An execution subject of a method for designing a gate driving circuit provided by an embodiment of the present disclosure may be a device for designing the gate driving circuit provided by the embodiment of the present disclosure, or an electronic device integrated with the device for designing the gate driving circuit. The device for designing the gate driving circuit may be implemented in hardware or software.

Embodiments of the present disclosure provide a method and a device for designing a gate driving circuit, a controller, and a storage medium. The detailed description will be given below.

Hereinafter, each step of the method for designing the gate driving circuit of the embodiment of the present disclosure will be described in detail below.

Figure 1:
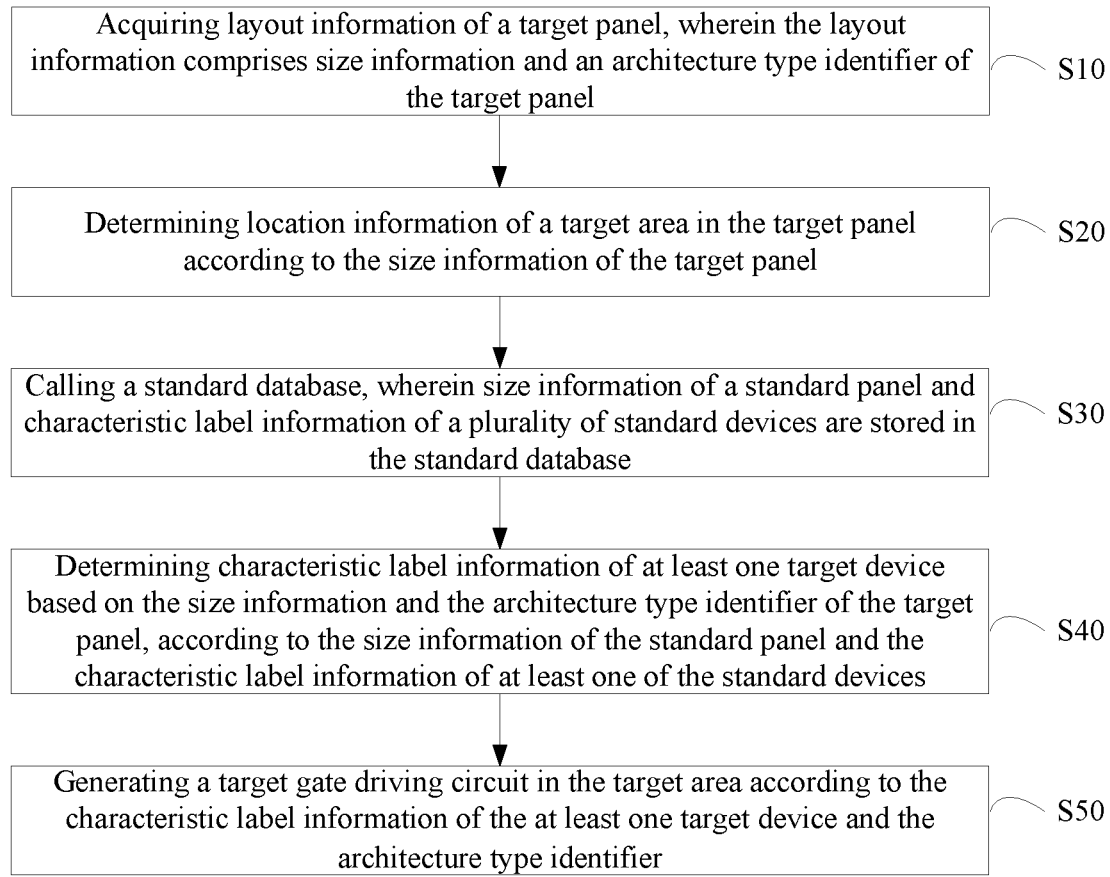
FIG. 1 is a flowchart of a first embodiment of a method for designing a gate driving circuit provided by an embodiment of the present disclosure.

In an embodiment, as shown in FIG. 1, the method may comprise but is not limited to the following steps.

S10: Acquiring layout information of a target panel, wherein the layout information comprises size information and an architecture type identifier of the target panel.

Wherein, the size information of the target panel may comprise shape information and size data information of the target panel. The shape information of the target panel may be shaped as "A", and the size data information of the target panel may be shaped as "B*C", "R", "D, E" or other forms, wherein A may represent "rectangular", "circular", "sector" or other shapes, and B, C, R, D, E may all represent numbers. For example, when the target panel is rectangular, the shape information of the target panel may be "rectangular", and the size data information of the target panel may be "B*C", wherein B and C may be a length value and a width value of a rectangle, respectively.

Wherein, the architecture type identifier may be shaped as "F", wherein F may represent a circuit architecture type of the gate driving circuit. It is understandable that the circuit architecture type of the gate driving circuit may be, but is not limited to, architecture types such as eleven-transistors-one-capacitor (11T1C), fourteen-transistors-one-capacitor (14T1C), four-transistors-one-capacitor (4T1C), and four-transistors-two-capacitors (4T2C). For example, F may be the 11T1C architecture, the 14T1C architecture, the 4T1C architecture, the 4T2C architecture or other architectures.

Wherein, the layout information of the target panel may be acquired by acquiring relevant information input from outside, or acquired by acquiring relevant information pre-stored in a relevant module. For example, layout information of a plurality of target panels may be stored in the relevant module in advance, and then the following operations are performed in sequence: acquiring layout information of a first target panel and performing related operations, acquiring layout information of a second target panel and performing related operations, until acquiring layout information of the last target panel and performing related operations.

S20: Determining location information of a target area in the target panel according to the size information of the target panel.

Wherein, the target area may be understood as an area where the gate driving circuit is arranged. Specifically, the gate driving circuit is generally located in an area close to a side of the target panel, and the location information of the target area may be determined according to the shape information and the size data information of the target panel in the size information of the target panel, in combination with requirements such as relative arrangement direction requirements of the gate driving circuit and sides of the target panel and the distance between the two. It should be noted that the location information of the target area may comprise relative location of at least one side of the target area and the target panel, and does not limit size data of the target area. For example, when the gate driving circuit is driven in a unidirectional driving manner, the target area may be located in an area close to a corresponding side of the target panel. When the gate driving circuit is driven in a bidirectional driving manner, the target area may comprise two areas close to two corresponding sides of the target panel, respectively.

S30: Calling a standard database, wherein size information of a standard panel and characteristic label information of a plurality of standard devices are stored in the standard database.

Wherein, the size information of the standard panel may refer to the relevant description of the size information of the target panel above. The standard panel may be understood as a panel of commonly used size or the standard panel may be understood as having a better design effect of a corresponding gate driving circuit. It should be noted that the characteristic label information of the plurality of standard devices corresponds to the standard panel. Specifically, the plurality of standard devices may be a plurality of devices in a gate driving circuit in a corresponding standard panel. The characteristic label information of each of the standard devices may comprise, but is not limited to, size information and location information of the standard device.

Further, the standard database may also store size information of a plurality of standard panels and characteristic label information of a plurality of standard devices corresponding to each of the standard panels.

S40: Determining characteristic label information of at least one target device based on the size information and the architecture type identifier of the target panel, according to the size information of the standard panel and the characteristic label information of at least one of the standard devices.

It is understandable that the architecture type identifier may indicate the circuit architecture type of the gate driving circuit in the target panel. The number of devices in different circuit architecture types is different. Further, when the size information of the target panel is fixed, at least one of size and location of devices in different circuit architecture types is different. Further, the standard database stores at least the characteristic label information of the at least one of the standard devices corresponding to each architecture type identifier. According to a corresponding relationship between the size information of the standard panel and the characteristic label information of the at least one of the standard devices corresponding to the architecture type identifier, it is also possible to determine a corresponding relationship between the size information of the target panel and the characteristic label information of the at least one of the standard devices corresponding to the architecture type identifier, and then based on the size information of the target panel, characteristic label information of at least one device in the gate driving circuit in the target panel can be determined as the characteristic label information of the at least one target device.

S50: Generating a target gate driving circuit in the target area according to the characteristic label information of the at least one target device and the architecture type identifier.

It is understandable that the characteristic label information of the plurality of target devices corresponds to the architecture type identifier, and combined with the above discussion, it can be known that the characteristic label information of each of the target devices comprises but is not limited to size information and location information of the target device, and each architecture type identifier may comprise quantity information and layout information of the target devices, wherein the quantity information in the architecture type identifier should be the same as the number of the plurality of target devices. Specifically, the size and location of the plurality of target devices may be determined first according to the characteristic label information of the plurality of target devices to generate an initial target gate driving circuit in the target area, and then the initial target gate driving circuit is checked and the plurality of the target devices in the initial target gate driving circuit is adjusted based on the quantity information and the layout information in the architecture type identifier to generate the target gate driving circuit in the target area.

In addition, at least one target gate driving circuit may be generated in the target area. Wherein, a size of the target area may be determined by an arrangement of the at least one target gate driving circuit located therein. Specifically, when a plurality of target gate driving circuits are generated in the target area, the plurality of target gate driving circuits may be arranged along a direction parallel to a corresponding side of the target panel, and each target gate driving circuit may drive a corresponding plurality of sub-pixels.

Figure 2:
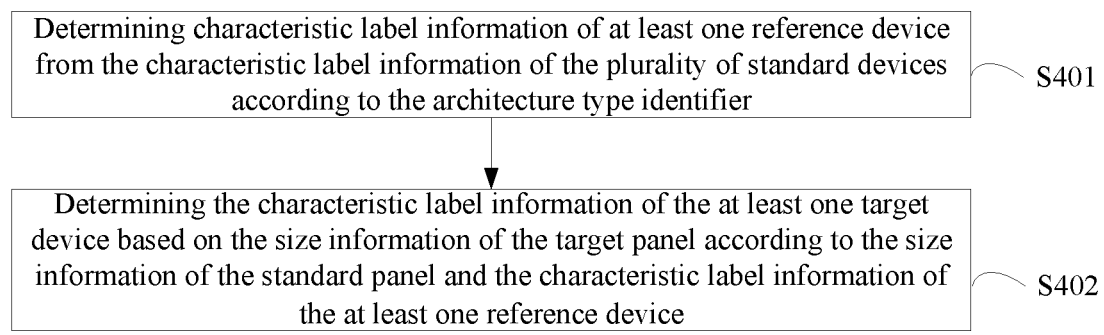
FIG. 2 is a flowchart of a second embodiment of a method for designing a gate driving circuit provided by an embodiment of the present disclosure.

In an embodiment, as shown in FIG. 2, the step S40 may comprise but is not limited to the following steps.

S401: Determining characteristic label information of at least one reference device from the characteristic label information of the plurality of standard devices according to the architecture type identifier.

It is understandable that the characteristic label information of all the target devices in the target gate driving circuit is related to the circuit architecture type. For example, for the gate driving circuit of the target panel whose circuit architecture type is 14T1C, compared to the gate driving circuit of the target panel whose circuit architecture type is 4T1C, the size of the plurality of target devices may be smaller, and vice versa. For another example, for the gate driving circuit of the target panel whose circuit architecture type is 14T1C, compared with the gate driving circuit of the target panel whose circuit architecture type is 4T1C, a gap between the plurality of target devices may be smaller, and vice versa.

It should be noted that the standard database may store a plurality of circuit architecture types of the gate driving circuit and the characteristic label information of the at least one standard device corresponding to each of the circuit architecture types. Specifically, the circuit architecture type of the corresponding gate driving circuit may be determined according to the architecture type identifier. Further, the characteristic label information of the corresponding at least one standard device may be determined as the characteristic label information of the at least one reference device from the characteristic label information of the plurality of standard devices according to the circuit architecture type of the gate driving circuit.

S402: Determining the characteristic label information of the at least one target device based on the size information of the target panel according to the size information of the standard panel and the characteristic label information of the at least one reference device.

It is understandable that according to the above analysis, the characteristic label information of all the target devices in the target gate driving circuit corresponds to the size of the target panel. For example, the larger the size of the target panel, the larger the size of each of the plurality of target devices may be, and vice versa. For another example, the larger the size of the target panel, the larger the gap between the plurality of target devices may be, and vice versa.

Specifically, on the premise that the circuit architecture type corresponding to the gate driving circuit is determined according to the architecture type identifier, the relationship between the size of the panel and the plurality of devices in the corresponding gate driving circuit may be determined first according to the size information of the standard panel and the characteristic label information of the at least one reference device, and then combined with the size information of the target panel, and the characteristic label information of the plurality of devices in the gate driving circuit of the target panel is obtained as the characteristic label information of the plurality of target devices.

Figure 3:
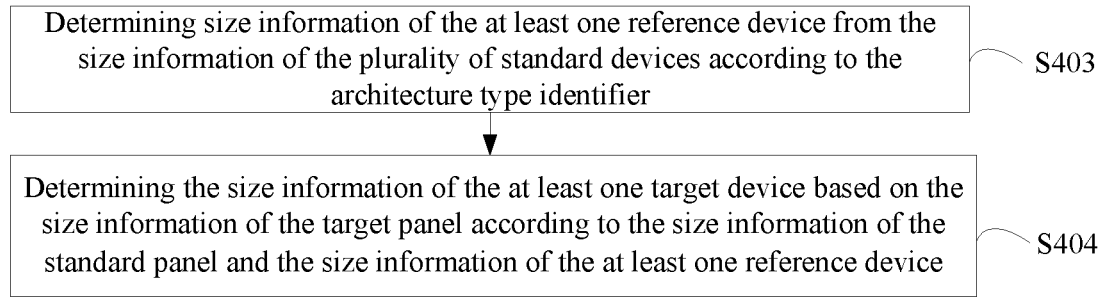
FIG. 3 is a flowchart of a third embodiment of a method for designing a gate driving circuit provided by an embodiment of the present disclosure.

In an embodiment, as shown in FIG. 3, the step S40 may include but is not limited to the following steps.

S403: Determining size information of the at least one reference device from the size information of the plurality of standard devices according to the architecture type identifier.

Wherein, the characteristic label information of the standard device comprises the size information of the standard device, the characteristic label information of the target device comprises the size information of the target device, and the size information of the standard device comprises the size of the reference device, and the size information of the reference device may be used to determine the size information of the target device. In combination with the above discussion, it can be seen that the characteristic label information of the plurality of target devices in the target gate driving circuit is related to the circuit architecture type of the gate driving circuit in the target panel, that is, the size information of the at least one standard device corresponding to the circuit architecture type of the gate driving circuit in the target panel may be selected from the size information of the plurality of standard devices as the size information of the at least one reference device, according to the architecture type identifier.

Specifically, the size information of the at least one reference device may comprise size information of a plurality of reference devices, and the size information of the plurality of reference devices may comprise but not limited to thin film transistor (TFT) size and boost capacitor (Cboost). Specifically, the gate driving circuit comprises a plurality of TFTs electrically connected, wherein the TFT size may indicate a size of any TFT in the gate driving circuit, the TFT size may comprise TFT Width, and the TFT Width may indicate a width value of a channel of a corresponding TFT, and the Cboost may indicate a size of a bootstrap capacitor in the gate driving circuit. Specifically, the gate driving circuit comprises a thin film transistor T21, a source of the thin film transistor T21 may be loaded with a clock signal, and a drain of the thin film transistor T21 may be electrically connected to a corresponding gate line to load a corresponding gate signal to the gate line. The TFT Width may be, but is not limited to, a channel width T21 Width of the thin film transistor T21, and the Cboost may be, but not limited to, a capacitance formed by a gate of the thin film transistor T21 and the drain of the thin film transistor T21. It is understandable that when other parameters are the same, the Cboost may be proportional to a relative area of the gate of the thin film transistor T21 and the drain of the thin film transistor T21.

S404: Determining the size information of the at least one target device based on the size information of the target panel according to the size information of the standard panel and the size information of the at least one reference device.

It can be understood that, in combination with the above discussion, the size information of the plurality of target devices in the target gate driving circuit is related to the size of the target panel. For example, under a same circuit architecture type of the gate driving circuit, the size and gap of the plurality of target devices may be positively correlated with the size of the corresponding target panel. Under the same circuit architecture type of the gate driving circuit, the following description will be made by taking the T21 Width and Cboost in the step S403 as an example:

$$T21\text{Width Targe}=T21\text{Width}*[(\text{Size Target})/(\text{Size STD})];$$

$$C\text{boost Targe}=C\text{boost}*[(\text{Size Target})/(\text{Size STD})];$$

Wherein, the Size Target and Size STD may be a length value of the target panel and a length value of the standard panel, respectively, or the Size Target and Size STD may be a width value of the target panel and a width value of the standard panel, respectively. The Size Target and Size STD may be an area value of the target panel and an area value of the standard panel, respectively. Physical meanings of the Size Target and Size STD can be adjusted according to conditions, as long as the two are related to the size of the panel and the size of the standard panel. The T21 Width Targe and the Cboost Targe may respectively represent the channel width of the thin film transistor T21 in the gate driving circuit in the target panel, and the capacitance formed by the gate of the thin film transistor T21 and the drain of the thin film transistor T21.

Figure 4:
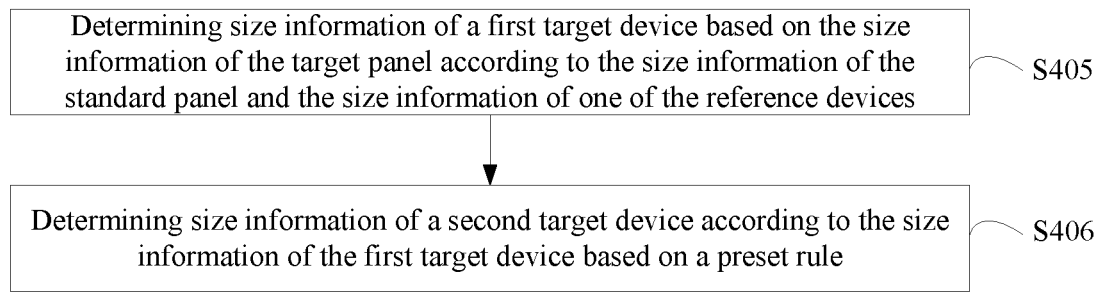
FIG. 4 is a flowchart of a fourth embodiment of a method for designing a gate driving circuit provided by an embodiment of the present disclosure.

In an embodiment, as shown in FIG. 4, the step S40 may comprise, but is not limited to, the following steps.

S405: Determining size information of a first target device based on the size information of the target panel according to the size information of the standard panel and the size information of one of the reference devices.

Wherein, the target gate driving circuit may comprise a plurality of target devices, and the plurality of target devices comprise at least one first target device. It should be noted that under the same circuit architecture type of the gate driving circuit, the size information of each target device may be understood as comprising size values of a plurality of parts in the target device, such as a length value and a width value. That is, the size information of the first target device may comprise size values of a plurality of parts in the first target device. The size information of the first target device may be, but is not limited to, the TFT Width and Cboost. Specifically, reference may be made to the relevant discussion in the step S404 to determine the size values of at least one part of the first target device as the size information of the first target device. Specifically, the size information of the first target device may also comprise the T21 Width Targe above.

S406: Determining size information of a second target device according to the size information of the first target device based on a preset rule.

Wherein, the plurality of target devices further comprises at least one second target device. Similarly, the size information of the second target device may comprise size values of at least one part of the second target device. It is understandable that a size relationship between some devices in panels of different sizes can satisfy a corresponding relationship formula. In this way, when a size of one of the target devices in the target panel is calculated, sizes of other target devices may be calculated based on the corresponding relationship formula. Wherein, the preset rule may be understood as comprising a mapping rule between the size information of the second target device and the size information of the first target device. It should be noted that the mapping rules of different parts of the first target device and the second target device may be the same or different.

It can be understood that the gate driving circuit also comprises a thin film transistor T41. A source of the thin film transistor T41 is electrically connected to the gate of the thin film transistor T21, and a drain of the thin film transistor T41 is loaded with a low voltage signal to pull down the gate of the thin film transistor T21 at a corresponding time. Specifically, the size information of the second target device may comprise a channel width T41 Width Targe of the thin film transistor T41, and a method for determining the T41 Width Targe is as follows:

$$T41 \text{ Width Targe}=A3*(T21 \text{ Width Targe});$$

Wherein, a value indicated by A3 may also be set according to actual conditions. It is understandable that under the same circuit architecture type of the gate driving circuit, the mapping rule of size values of parts of the second target device and the first target device is determined. The mapping rule at this time is the preset rule, and the preset rule may be stored in the standard database. That is, a size of a corresponding part in the second target device may be determined according to the preset rule.

Figure 5:
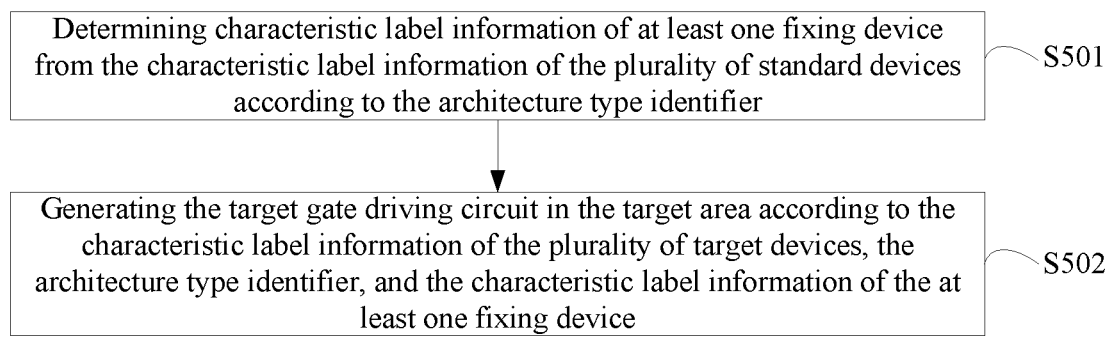
FIG. 5 is a flowchart of a fifth embodiment of a method for designing a gate driving circuit provided by an embodiment of the present disclosure.

In an embodiment, as shown in FIG. 5, the step S50 may comprise but is not limited to the following steps.

S501: Determining characteristic label information of at least one fixing device from the characteristic label information of the plurality of standard devices according to the architecture type identifier.

Wherein, the plurality of target devices further comprise at least one fixing device, and the fixing device may be a part of the target devices that has nothing to do with the size information of the target panel, that is, size and location of the fixing device may not be related to the size information of the target panel, but only related to the architecture type identifier. It is understandable that under the same circuit architecture type of the gate driving circuit, no matter how large the size of the target panel, the characteristic label information of the fixing device is the same, that is, the characteristic label information of the fixing device is only related to the circuit architecture type of the gate driving circuit in the target panel.

It can be understood that according to the above analysis, the gate driving circuit comprises a plurality of thin film transistors electrically connected, and each of the thin film transistors comprises a channel, a gate, a source, and a drain. Wherein, the characteristic label information of the at least one fixing device may comprise characteristic label information of a plurality of fixing devices. Specifically, the characteristic label information of the plurality of fixing devices may comprise, but is not limited to, TFT channel length, drain width, source width, and source to gate space. Wherein, the TFT channel length may represent a length of a channel of any thin film transistor in the gate driving circuit of the standard panel, the drain width may represent a width of a drain of any thin film transistor, the source width may represent a width of a source of any thin film transistor, and the source to gate space may represent a horizontal interval between a source and a gate of any thin film transistor.

S502: Generating the target gate driving circuit in the target area according to the characteristic label information of the plurality of target devices, the architecture type identifier, and the characteristic label information of the at least one fixing device.

It is understandable that the plurality of target devices comprise the at least one fixing device and other target devices. According to the above analysis, size information and location information of each fixing device may be determined by the characteristic label information of the corresponding fixing device. Size information and location information of each of the other target devices may be determined by the characteristic label information of the corresponding target device. Wherein, the characteristic label information of the plurality of target devices and the characteristic label information of the plurality of fixing devices all correspond to the architecture type identifier, and each architecture type identifier may comprise the quantity information and the layout information of the target device and quantity information and layout information of the fixing devices, wherein the quantity information in the architecture type identifier should be the same as a sum of the number of the plurality of target devices and the number of the plurality of fixing devices.

Specifically, the size and location of the plurality of target devices may be determined first according to the characteristic label information of the plurality of target devices, and size and location of the at least one fixing device may be determined according to the characteristic label information of the at least one fixing device to generate the initial target gate driving circuit, and then the initial target gate driving circuit is checked and the plurality of target devices are adjusted based on the quantity information and layout information in the architecture type identifier to determine the target gate driving circuit.

Further, after the step S50, it may also include but is not limited to the following steps: checking according to rules, determining whether the target gate driving circuit is qualified; if not, adjusting at least one target structure or at least one fixing structure until the target gate driving circuit is qualified.

It is understandable that in the process of determining the target gate driving circuit according to the characteristic label information of the plurality of target devices and the architecture type identifier, due to the setting of parameters or the setting of rules, sizes of some parts of some target devices are not in a corresponding preset range. At this time, a size of a part whose size is not in the preset range may be adjusted, or even sizes of other parts related to an unqualified part may be adjusted until the target gate driving circuit is qualified.

In order to better implement the above method, the present disclosure also provides a device for designing a gate driving circuit.

Figure 6:
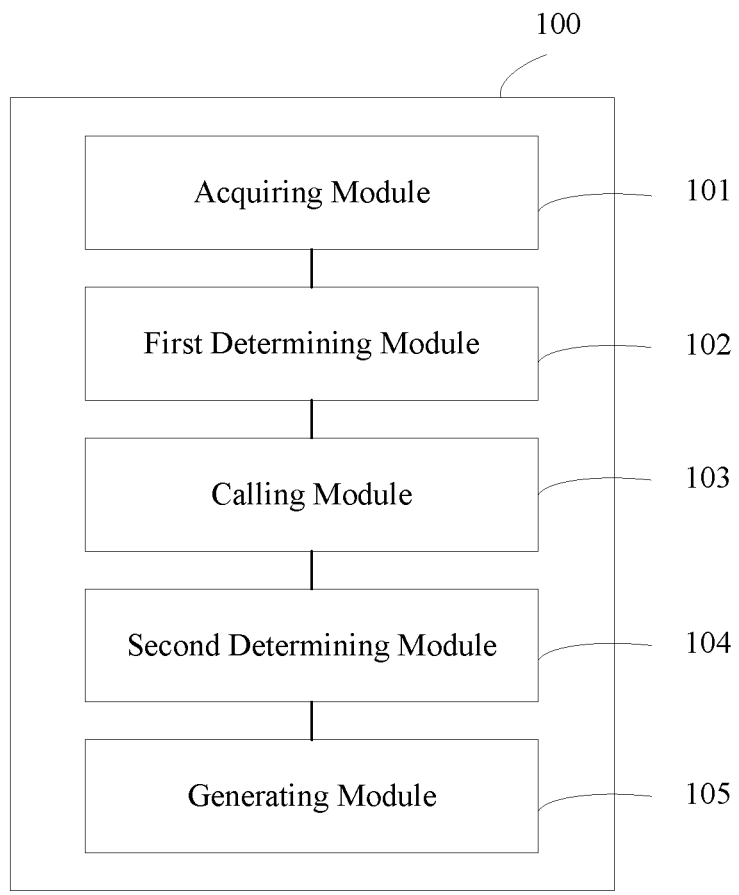
FIG. 6 is a schematic diagram of a device for designing a gate driving circuit provided by an embodiment of the present disclosure.

Please refer to FIG. 6, which is a schematic structural diagram of a device 100 for designing a gate driving circuit provided by an embodiment of the present disclosure. The device 100 for designing the gate driving circuit of this embodiment may include, but is not limited to, the following modules.

An acquiring module 101, which is configured to acquire layout information of a target panel, wherein the layout information of the target panel comprises size information and an architecture type identifier of the target panel.

Specifically, the acquiring module 101 may execute the step S10, and for details, reference may be made to the relevant description of the step S10 above.

A first determining module 102, which is configured to determine location information of a target area in the target panel according to the size information of the target panel.

Specifically, the first determining module 102 may execute the step S20, and for details, reference may be made to the relevant description of the step S20 above.

A calling module 103, which is configured to call a standard database, wherein the standard database stores size information of a standard panel and characteristic label information of a plurality of standard devices.

Specifically, the calling module 103 may execute the step S30, and for details, reference may be made to the relevant description of the step S30 above.

A second determining module 104, which is configured to determine characteristics label information of at least one target device based on the size information and the architecture type identifier of the target panel according to the size information of the standard panel and the characteristic label information of at least one of the standard device.

Specifically, the second determining module 104 may execute the step S40, and for details, reference may be made to the relevant description of the step S40 above.

A generating module 105, which is configured to generate a target gate driving circuit in the target area according to the characteristic label information of the at least one target device and the architecture type identifier.

Specifically, the generating module 105 may execute the step S50, and for details, reference may be made to the relevant description of the step S50 above.

In an embodiment, the second determining module 104 may include but is not limited to the following modules.

A first sub-determining module, which is configured to determine characteristic label information of at least one reference device from the characteristic label information of the plurality of standard devices according to the architecture type identifier.

Specifically, the first sub-determining module may execute the step S401, and for details, reference may be made to the relevant description of the step S401 above.

A second sub-determining module, which is configured to determine the characteristic label information of at least one target device based on the size information of the target panel according to the size information of the standard panel and the characteristic label information of the at least one reference device.

Specifically, the second sub-determining module may execute the step S402, and for details, reference may be made to the relevant description of the step S402 above.

In an embodiment, the second determining module 104 may further comprise but is not limited to the following modules.

A third sub-determining module, which is configured to determine size information of the at least one reference device from size information of the plurality of standard devices according to the architecture type identifier.

Specifically, the third sub-determining module may execute the step S403, and for details, reference may be made to the relevant description of the step S403 above.

A fourth sub-determining module, which is configured to determine size information of the at least one target device based on the size information of the target panel according to the size information of the standard panel and the size information of the at least one reference device.

Specifically, the fourth sub-determining module may execute the step S404, and for details, reference may be made to the relevant description of the step S404 above.

In an embodiment, a controller and a memory are further provided.

Figure 7:
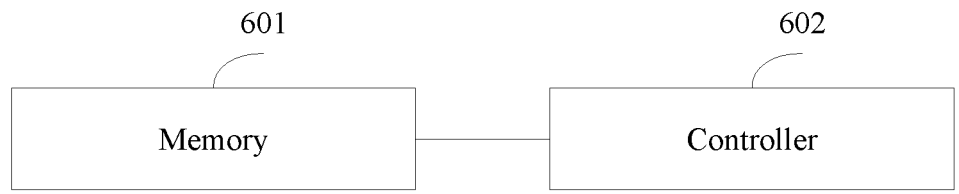
FIG. 7 is a schematic structural diagram of a controller and a memory provided by an embodiment of the present disclosure.

Please refer to FIG. 7, which is a schematic structural diagram of a controller and a memory provided by an embodiment of the present disclosure.

A memory 601 may be configured to store software programs and modules, and the memory 601 mainly comprises a program storage area and a data storage area. The controller 602 executes various functional applications and data processing by running software programs and modules stored in the memory 601.

The controller 602 executes various functions and processes data by running or executing at least one of the software programs and the modules stored in the memory 601 and calling data stored in the memory 601 to perform overall monitoring.

In some embodiments, the controller 602 acquires the layout information of the target panel, and the layout information of the target panel comprises the size information and the architecture type identifier of the target panel. The controller 602 determines the location information of the target area in the target panel according to the size information of the target panel. The controller 602 calls the standard database, which stores the size information of the standard panel and the characteristic label information of the plurality of standard devices. The controller 602 determines the characteristic label information of the at least one target device based on the size information and the architecture type identifier of the target panel according to the size information of the standard panel and the characteristic label information of the at least one standard device. The controller 602 generates the target gate driving circuit in the target area according to the characteristic label information of the at least one target device and the architecture type identifier.

In some embodiments, the controller 602 determines the characteristic label information of the at least one reference device from the characteristic label information of the plurality of standard devices according to the architecture type identifier. The controller 602 determines the characteristic label information of the at least one target device based on the size information and the architecture type identifier of the target panel according to the size information of the standard panel and the characteristic label information of the at least one reference device.

In some embodiments, the characteristic label information of the standard device comprises the size information of the standard device, the size information of the standard device comprises the size information of the reference device, the characteristic label information of the target device comprises the size information of the target device, and the size information of the reference device is used to determine the size information of the target device. The controller 602 determines the size information of the at least one reference device from the plurality of standard devices according to the architecture type identifier. The controller 602 determines the size information of the at least one target device based on the size information of the target panel according to the size information of the standard panel and the size information of the at least one reference device.

In some embodiments, the controller 602 determines the size information of the first target device based on the size information of the target panel according to the size information of the standard panel and the size information of one of the reference devices. The controller 602 determines the size information of the second target device according to the size information of the first target device based on the preset rule.

In some embodiments, the target gate driving circuit further comprises at least one fixing device, and the controller 602 determines the characteristic label information of the at least one fixing device from the characteristic label information of the plurality of standard devices according to the architecture type identifier. The controller 602 generates the target gate driving circuit in the target area according to the characteristic label information of the plurality of the target devices, the architecture type identifier, and the characteristic label information of the at least one fixing device.

It should be noted that those of ordinary skill in the art can understand that all or part of the steps in the various methods of the above-mentioned embodiments can be completed by programs instructing relevant hardware, and the program can be stored in a computer-readable storage medium, such as stored in a memory of an electronic device and executed by at least one processor in the electronic device. The process of execution may include a flow of an embodiments of a charging reminding method. Wherein, the storage medium may comprise: Read Only Memory (ROM), Random Access Memory (RAM), magnetic disks, optical disks, or the like.

The present disclosure provides a method and a device for designing a gate driving circuit, a controller, and a storage medium. The method comprises: acquiring the size information and the architecture type identifier of the target panel; determining the location information of the target area in the target panel according to the size information of the target panel; calling the size information of the standard panel and the characteristic label information of the plurality of standard devices in the standard database, and determining the characteristic label information of the at least one target device based on the size information and architecture type identifier of the target panel; and further generating the target gate driving circuit in the target area according to the architecture type identifier. This method can call the size information of the standard panel and the characteristic label information of the at least one standard device in the standard database according to the layout information of the target panel, and determine the location information of the target area and the characteristic label information of the plurality of target devices based on the size information of the target panel and the architecture type identifier to generate the target gate driving circuit in the target area, which prevents acquiring information such as the size information and the location information of all devices in the target gate driving circuit of the target panel to determine the target gate driving circuit, and also prevents manually inputting data to determine the target gate driving circuit. Rather, the target gate driving circuit is determined directly based on the layout information of the target panel and the relevant information in the standard database, which improves the drawing efficiency of the gate driving circuit of the display panel.

The method generates the target gate driving circuit according to the size information of the target panel, the architecture type identifier, and the relevant information in the standard database, which prevents the manual input of data to generate the target gate driving circuit, and improves the drawing efficiency of the gate driving circuit of the display panel.

The method and device for designing the gate driving method, the controller, and the storage medium provided by the embodiments of the present disclosure are described in detail above. Each functional module can be integrated in a processing chip, or can exist separately and physically, or two or more modules can be integrated in one module. The above-mentioned integrated modules can be implemented in the form of hardware or software functional modules. In the present disclosure, specific examples are used to describe the principles and implementation of the present disclosure. The description of the above embodiments is only used to help understand the technical solutions and core ideas of the present disclosure; at the same time, for those skilled in the art, according to the ideas of the present disclosure, specific implementations and application scopes will have changes. In summary, the content of this specification should not be construed as limiting the present disclosure.

What is claimed is:

1. A method for designing a gate driving circuit, which comprises:
    acquiring layout information of a target panel, wherein the layout information comprises size information and an architecture type identifier of the target panel;
    determining location information of a target area in the target panel according to the size information of the target panel;
    calling a standard database, wherein the standard database stores size information of a standard panel and characteristic label information of a plurality of standard devices;
    determining characteristic label information of at least one target device based on the size information and the architecture identifier of the target panel according to the size information of the standard panel and the characteristic label information of at least one of the standard devices; and
    generating a target gate driving circuit in the target area according to the characteristic label information of the at least one target device and the architecture type identifier.

2. The method for designing the gate driving circuit according to claim 1, wherein the step of determining the characteristic label information of the at least one target device based on the size information and the architecture type identifier of the target panel according to the size information of the standard panel and the characteristic label information of the at least one of the standard devices comprises:
    determining characteristic label information of at least one reference device from the characteristic label information of the plurality of standard devices according to the architecture type identifier; and
    determining the characteristic label information of the at least one target device based on the size information of the target panel according to the size information of the standard panel and the characteristic label information of the at least one reference device.

3. The method for designing the gate driving circuit according to claim 2, wherein the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

4. The method for designing the gate driving circuit according to claim 3, wherein size information of a plurality of reference devices comprises thin film transistor (TFT) size and boost capacitor (Cboost);
    wherein a gate driving circuit of the standard panel comprises a plurality of thin film transistors electrically connected, wherein the TFT size is a size of any one of the thin film transistors, the TFT size comprises TFT Width, and the TFT Width is a channel width value of a corresponding thin film transistor, and the Cboost is a size of a bootstrap capacitor in the gate driving circuit of the standard panel.

5. The method for designing the gate driving circuit according to claim 3, wherein the target gate driving circuit comprises a plurality of target devices, and the plurality of target devices comprise a first target device and a second target device; and
    the step of determining the characteristic label information of the at least one target device based on the size information and the architecture type identifier of the target panel according to the size information of the standard panel and the characteristic label information of the at least one of the standard devices comprises:

determining size information of the first target device based on the size information of the target panel according to the size information of the standard panel and the size information of one reference device; and determining size information of the second target device according to the size information of the first target device based on a preset rule.

6. The method for designing the gate driving circuit according to claim 5, wherein in the second target device and the first target device, preset rules of size information of different parts are the same or different.

7. The method for designing the gate driving circuit according to claim 1, wherein the target gate driving circuit further comprises at least one fixing device, and the step of generating the target gate driving circuit in the target area according to the characteristic label information of the at least one target device and the architecture type identifier comprises:

determining characteristic label information of the at least one fixing device from the characteristic label information of the plurality of standard devices according to the architecture type identifier; and generating the target gate driving circuit in the target area according to the characteristic label information of the at least one target device, the architecture type identifier, and the characteristic label information of the at least one fixing device.

8. The method for designing the gate driving circuit according to claim 7, wherein the characteristic label information of the at least one fixing device comprises TFT channel length, drain width, source width, and source to gate space;

wherein a gate driving circuit of the standard panel comprises a plurality of thin film transistors electrically connected, wherein the TFT channel length is a channel length of any one of the thin film transistors, the drain width is a width of a drain of any one of the thin film transistors, the source width is a width of a source of any one of the thin film transistors, and the source to gate space is a horizontal interval between the source and a gate of any one of the thin film transistors.

9. A device for designing a gate driving circuit, which comprises:

an acquiring module configured to acquire layout information of a target panel, wherein the layout information comprises size information and an architecture type identifier of the target panel;

a first determining module configured to determine location information of a target area in the target panel according to the size information of the target panel;

a calling module configured to call a standard database, wherein the standard database stores size information of a standard panel and characteristic label information of a plurality of standard devices;

a second determining module configured to determine characteristic label information of at least one target device based on the size information and the architecture type identifier of the target panel according to the size information of the standard panel and the characteristic label information of at least one of the standard devices; and a generating module configured to generate a target gate driving circuit in the target area according to the characteristic label information of the at least one target device and the architecture type identifier.

10. The device for designing the gate driving circuit according to claim 9, wherein the second determining module comprises:

a first sub-determining module configured to determine characteristic label information of at least one reference device from the characteristic label information of the plurality of standard devices according to the architecture type identifier; and a second sub-determining module configured to determine the characteristic label information of the at least one target device based on the size information of the target panel according to the size information of the standard panel and the characteristic label information of the at least one reference device.

11. The device for designing the gate driving circuit according to claim 10, wherein the characteristic label information of the standard devices comprises size information of the standard devices, and the size information of the standard devices comprises the size information of the reference device, the characteristic label information of the target device comprises size information of the target device, and the size information of the reference device is used to determine the size information of the target device, and wherein the second determining module further comprises:

a third sub-determining module configured to determine the size information of the at least one reference device from the size information of the plurality of standard devices according to the architecture type identifier; and a fourth sub-determining module configured to determine the size information of the at least one target device based on the size information and the architecture identifier of the target panel according to the size information of the standard panel and the size information of the at least one reference device.

12. A controller, wherein the controller is configured to execute a number of instructions stored in a memory to implement a method for designing a gate driving circuit, and the method comprises:

acquiring layout information of a target panel, wherein the layout information comprises size information and an architecture type identifier of the target panel;

determining location information of a target area in the target panel according to the size information of the target panel;

calling a standard database, wherein the standard database stores size information of a standard panel and characteristic label information of a plurality of standard devices;

determining characteristic label information of at least one target device based on the size information and the architecture type identifier of the target panel according to the size information of the standard panel and the characteristic label information of at least one of the standard devices; and generating a target gate driving circuit in the target area according to the characteristic label information of the at least one target device and the architecture type identifier.

13. The controller according to claim 12, wherein the step of determining the characteristic label information of the at least one target device based on the size information and the architecture type identifier of the target panel according to the size information of the standard panel and the characteristic label information of the at least one of the standard devices comprises:

determining characteristic label information of at least one reference device from the characteristic label information of the plurality of standard devices according to the architecture type identifier; and determining the characteristic label information of the at least one target device based on the size information of the target panel according to the size information of the standard panel and the characteristic label information of the at least one reference device.

14. The controller according to claim 13, wherein the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

15. The controller according to claim 14, wherein the target gate driving circuit comprises a plurality of target devices, and the plurality of target devices comprise a first target device and a second target device; and the step of determining the characteristic label information of the at least one target device based on the size information and the architecture type identifier of the target panel according to the size information of the standard panel and the characteristic label information of the at least one of the standard devices comprises:

determining size information of the first target device based on the size information of the target panel according to the size information of the standard panel and the size information of one reference device; and determining size information of the second target device according to the size information of the first target device based on a preset rule.

* * * * *